April 1, 1969

E. ALLGAIER 3,435,703

DUAL CONTROL VEHICLE BRAKE SYSTEM FOR
DRIVER TRAINING AUTOMOBILES

Filed April 26, 1967

INVENTOR

EARL ALLGAIER

BY Albert H Kirchner

ATTORNEY

INVENTOR
EARL ALLGAIER
BY (signature)
ATTORNEY

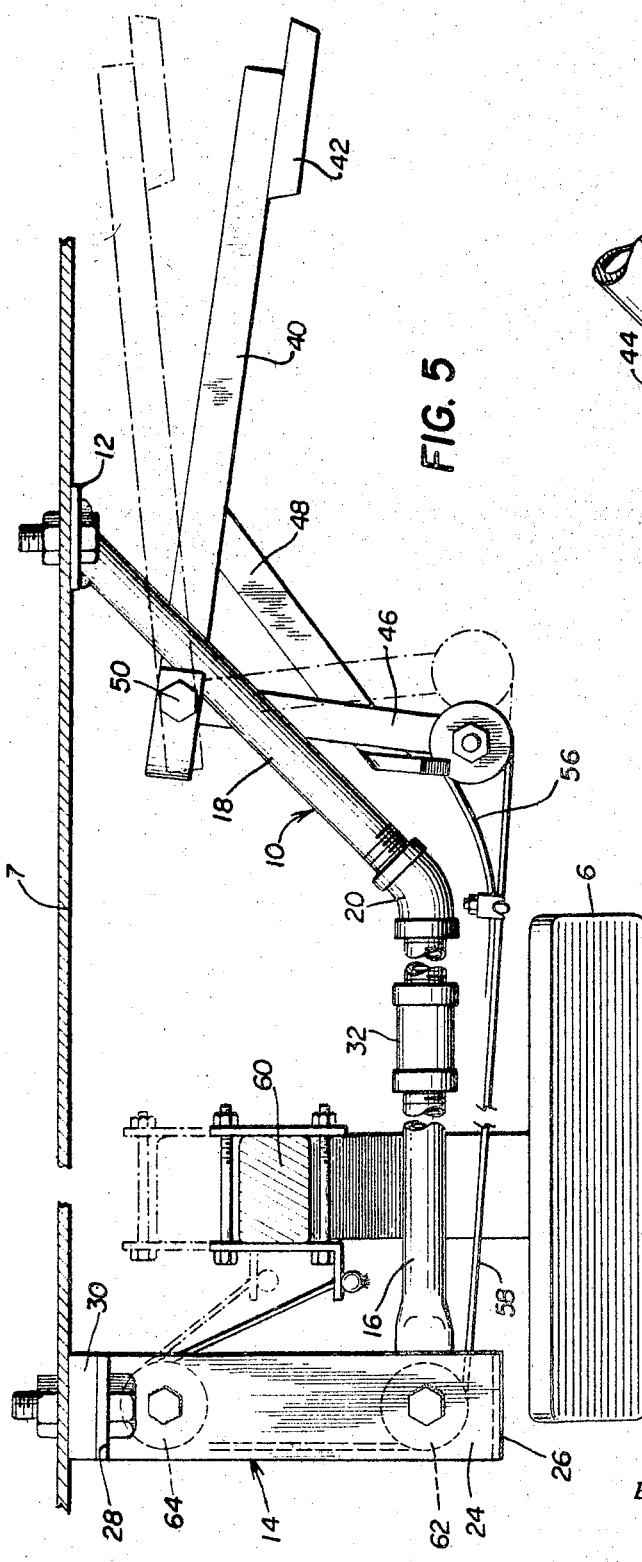
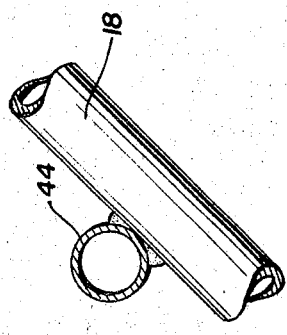

3,435,703
DUAL CONTROL VEHICLE BRAKE SYSTEM FOR DRIVER TRAINING AUTOMOBILES
Earl Allgaier, 2534 24th St. N.,
Arlington, Va. 22207
Filed Apr. 26, 1967, Ser. No. 633,805
Int. Cl. G05g 1/16
U.S. Cl. 74—562.5                                3 Claims

ABSTRACT OF THE DISCLOSURE

For use by an instructor in training a student driver, a rigid, pipe-like frame member is fixed across the floor of a conventional automobile in front of the two front seats, and a supplemental brake pedal is pivoted to the right hand end of the frame in front of the instructor's seat and is cable-connected to the regular brake pedal in front of the student's seat at the left side of the car, so that actuation of the supplemental pedal will apply the brakes.

---

The present invention relates to driver training automobiles and more particularly to a device for installation in a conventional motor car to provide a supplemental brake applicator for use by the instructor, seated in the front seat alongside the seat occupied by the student, to stop the vehicle in any emergency by application of the regular brake system of the vehicle independently of actuation of the regular brake pedal.

Designing such devices for sale to and use by public schools, motor clubs, private driver training instructors and the like has presented difficulties because of the many different kinds and styles of automobiles to which the devices must be applied and the wide variation in body size, brake pedal design and position, floor contour, steering column and fire wall angle, and other variables that have in the past severely limited the use of most supplemental brake applicators to one or very few car models.

A principal object of the present invention is to provide a highly versatile device of the character indicated which can be installed in substantially any conventional automobile with, at the most, interchange of a single minor element.

A related object is to provide a supplemental, instructor's brake pedal and a mechanical linkage between it and the regular brake pedal that can be readily installed and will unfailingly connect the two pedals for operation of the brake system of the vehicle by either pedal independently of actuation of the other.

Incidental objects are concerned with making the device simple in construction, inexpensive to make and install, and thoroughly dependable and unfailing in operation.

A preferred form of embodiment that has given entirely satisfactory service in actual use is shown in the accompanying drawing in which FIG. 1 is a perspective view of the front seat portion of a conventional type of automobile body showing the new device installed in operative position;

FIG. 5 is a view, largely in plan, taken on the section line 5—5 of FIG. 1, looking in the direction of the arrows; and FIG. 6 is a fragmentary elevational view of the pivot mounting for the supplemental brake pedal.

Figure 1:
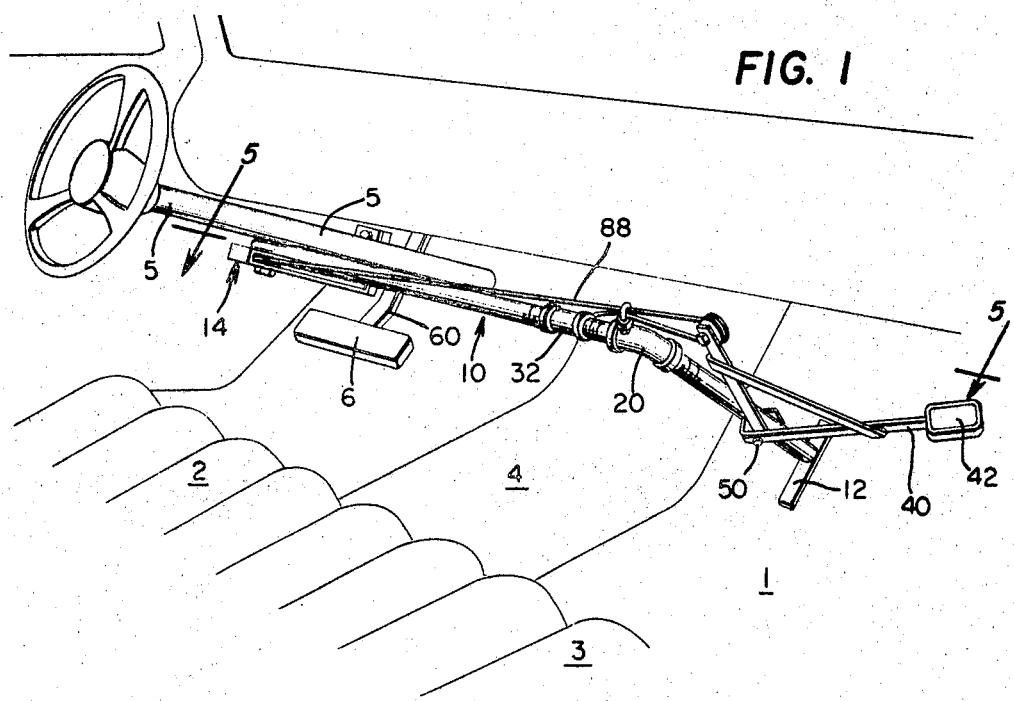

In these figures the reference numeral 1 designates the floor of a conventional passenger automobile body in front of the usual two front seats, or equivalent two front seat areas of a single seat cushion, the seat or area 2 on the left being occupied by the regular driver, or the student driver in the present case, and the seat or area 3 on the right being occupied by a passenger or, in the present case, by the driving instructor. An elevation 4 of varying height in different makes and models intervenes between the floor areas in front of the two seats to accommodate the transmission, propeller shaft and appurtenant mechanism connecting the vehicle engine and its running gear.

It is the dimension of this elevation 4, in respect of height and width, and both absolutely and relative to the location of the steering column 5, conventional brake pedal 6, fire wall 7 (see FIG. 4) and other parts of the car, as well as the relationships of these parts and fixtures of the vehicle, that creates the problem of fitting a supplemental brake pedal for the instructor into the car and connecting it with the student's brake pedal, as will be understood.

Figure 2:
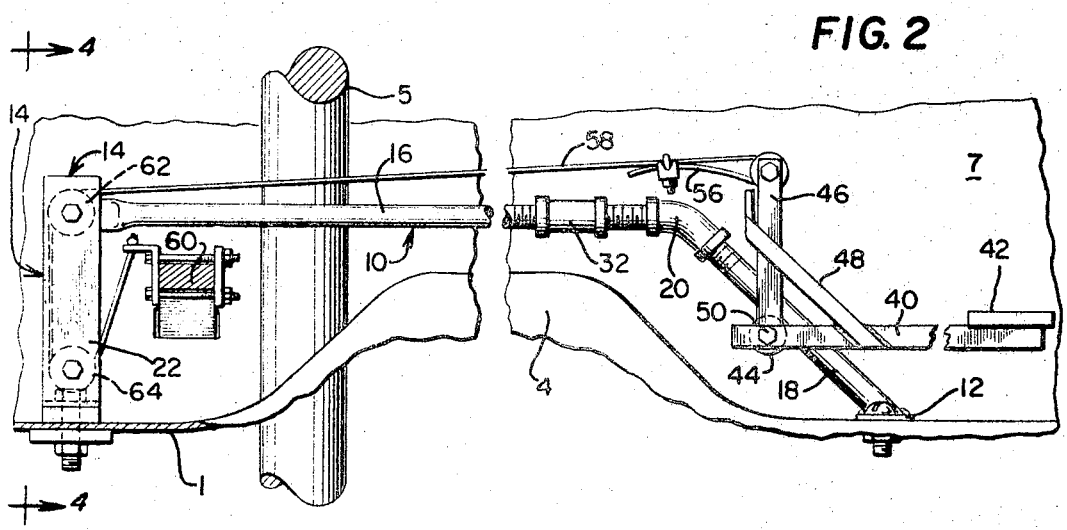
FIG. 2 is a front elevational view of the installation.
Figure 3:
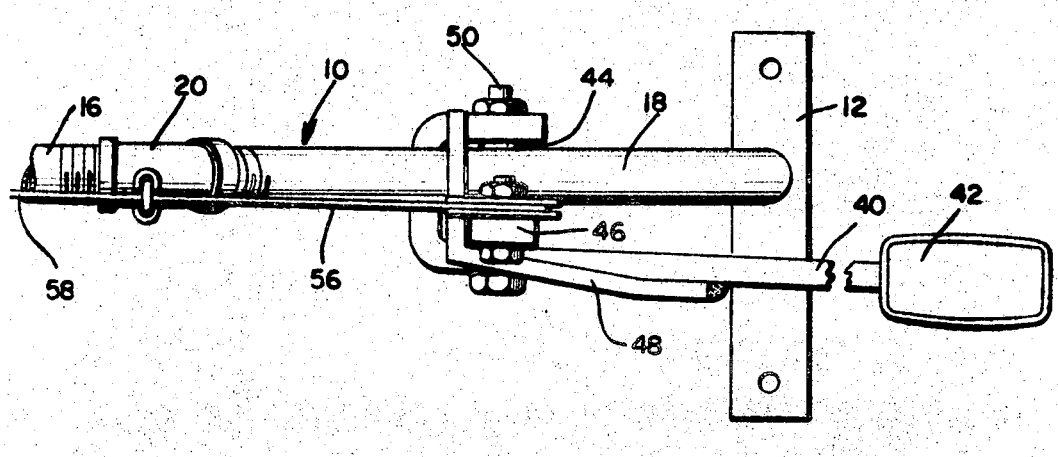
FIG. 3 is a detail top plan view of the right hand portion of the installation shown in FIGS. 1 and 2.

In accordance with the present invention, there is provided a rigid frame member 10 which is mounted to extend across the front floor of the car from the front of the instructor's seat 3 to the front of the student's seat 2. This frame member is elongated and in the preferred embodiment may be generically described as rod-like, either solid or hollow, being readily formed of conventional pipe stock. One end portion, disposed in front of the instructor's seat 3, terminates in a fixed pad 12 which is screwed, bolted or otherwise anchored to the car floor. The opposite end portion terminates adjacent to the steering column 5 in front of the student's seat 2 in a pulley frame 14 hereinafter to be described. To accommodate the elevation 4, whatever may be its height and width in any particular car, and to fit cars of any front floor width, the frame member 10, as best shown in FIG. 2, is made in two sections, a relatively long section 16 surmounting the elevation and having the pulley frame 14 fixed to its outer or left hand end, and a relatively short section 18 rising at its outer or right hand end from the floor pad 12 and having its inner end detachably coupled to the inner end of the longer section to make up a composite frame 10 incorporating an oblique, i.e., obtuse, angle near its instructor's seat end portion as shown in FIG. 2. It is convenient to use pipe stock for the sections and a coupling in the form of a conventional threaded elbow 20, as shown, but this specific choice of parts is not essential to the invention broadly considered.

It will be evident that, using a single size of longer section 16 and a single size of coupling 20, any one of various lengths of shorter section 18 may be used to fit any of a wide range of automobile models and in each of them properly surmount the elevation 4 spanning the two front seat floor areas as required by the invention. However, as will be later pointed out, to accommodate an even broader range of vehicle models, the longer section 16 may be provided in two straight sub-sections, which is the preferred form of the invention as shown in FIG. 2.

Figure 4:
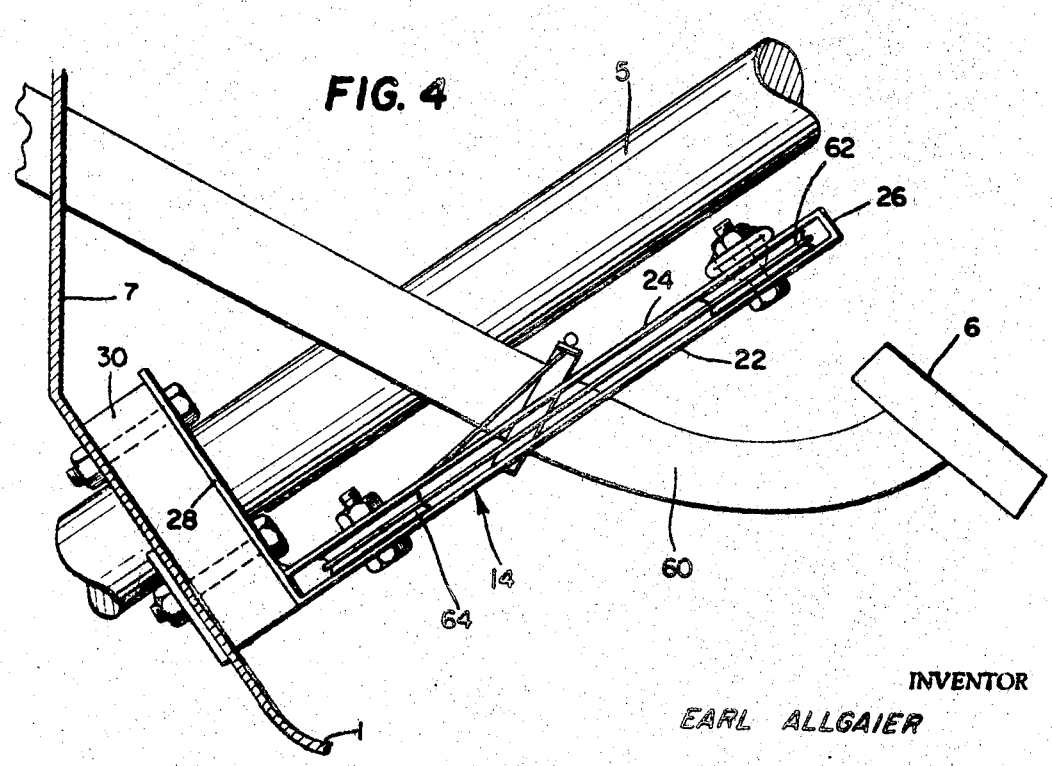
FIG. 4 is a left end elevational view of the installation, taken in section through the vehicle fire wall on the line 4—4 of FIG. 2.

The free end of the longer section of the frame 10 carries the pulley frame 14. This is conveniently made in the form of a length of heavy strap iron stock bent as shown best in FIG. 4 to provide a pair of spaced plate portions 22 and 24, integrally connected by an upper bight portion 26, with the lower end of the plate portion 22 right-angularly extended to provide a bracket portion 28 which is bolted securely to the fire wall 7 or, as best shown in FIG. 4, to the merging portion of the fire wall and floor. As suggested in FIG. 4, it may be desirable in some cases to interpose a shim or filler block 30 of suitable thickness in order to dispose the pulley frame 14 and the frame member 10 at the preferred substantially right angular relation shiwn in FIG. 2.

To facilitate installation of the parts in this relation, and to accommodate vehicles of varying width, steering column and brake pedal location, it is convenient as hereinabove suggested, to divide the longer section 16 of the frame member 10 into the two sub-sections connected by a short nipple 32. Thus the main sub-section which has its left end specially formed for pivoting to the pulley frame can be made in a single uniform length, and the shorter sub-section connecting the nipple to the elbow can be selected from a number of pipes of different length.

The function of the combination of frame member 10 and pulley frame 14, installed securely by means of the pad 12 and bracket portion 28 as just explained, is to support a connection from the standard brake pedal 6 of the car, which is operable by the student driver, to a supplemental brake pedal provided for emergency use by the instructor.

For this purpose a supplemental brake pedal 40 is mounted on the frame member so that a conventional pad 42 formed on its free end is within convenient reach of a person occupying the seat 3. The other end of this pedal is pivoted to the shorter section 18 of the frame member 10 in an arrangement best shown in FIGS. 1, 2 and 6. As there seen, the frame section 18 has welded to it a short ferrule 44; the pedal shank 40 terminates in a U-shaped yoke which extends around the ferrule and the section 18; a stout iron strut 46 is secured to the section 18 by a diagonal brace 48 in such a relation that the parts 46 and 40 constitute a substantially right angular bellcrank. At the vertex of this bellcrank a pivot pin 50 stands through the ferrule 44 and aligned openings in the parts 40 and 46.

Thus, with the strut 46 normally upstanding vertically as shown in FIG. 2, depression of the pedal pad 42 will swing the strut to the right; and release of the pedal will allow the strut to swing to the left and resume its substantially vertical position.

To the upper end of the strut 46, i.e., the end of the bellcrank supplemental pedal shank which is opposite the pedal pad 42, there is anchored, at 56, one end of a cable 58. The other end of this cable is anchored to the shank 60 of the conventional brake pedal 6. The intervening length of cable extends along the frame member 10 and over an upper pulley 62 and a lower pulley 64 in the pulley frame 14. As best shown in FIGS. 2, 4 and 5, the arrangement is such that when the cable 58 is pulled by depression of the supplemental brake pedal 42, the conventional brake pedal 6 will be depressed and when pressure on the supplemental pedal is released the conventional brake pedal will be returned to released position by the customary return spring means.

Thus the mechanism provides supplemental braking of the vehicle under the control of the instructor independently of operation of the conventional brake pedal by the student or otherwise.

It may be mentioned here that attempts have been made in the past to connect a supplemental brake applicator pedal to the conventional driver's seat brake pedal by means of a Bowden wire or other type of cable encased in tubing. These arrangements have been unsatisfactory because friction of the cable rubbing on the inner surfaces of the tubing, particularly in the region of bends in the latter, has operated to hold the brake applied on release of the supplemental pedal, or has required objectionable strengthening of the main pedal return spring. The new construction substantially eliminates all friction inasmuch as the cable makes no rubbing engagement with any fixed surface. It rolls over only two two-inch pulleys, which of course can be well lubricated so that the standard brake pedal return spring is adequate to restore both pedals to retracted position instantly after depression and release.

It is to be understood that the principles of the invention are capable of being embodied in specific constructions different from those which have been hereinabove described and which are shown in the accompanying drawings merely by way of exemplification of a preferred embodiment.

I claim:
1. A supplemental brake applicator device for a dual control motor vehicle having a driver's seat and an adjacent front seat and having a driver's brake pedal adjacent to the driver's seat, said device comprising
   a rigid elongated frame member having one end portion anchored in fixed relation to the vehicle floor in front of said adjacent front seat and its opposite end portion fixed relative to and adjacent said driver's brake pedal,
   a supplemental brake pedal pivoted to said first named end portion of the frame member,
   a strut rigidly connected to said supplemental brake pedal and upstanding therefrom,
   and a cable having one end operatively connected to said strut, extending in spaced relation over said frame member, and having its opposite end operatively connected to said driver's brake pedal
   for actutting said driver's brake pedal when said supplemental brake pedal is actuated.

2. A supplemental brake applicator device for a dual control motor vehicle having a driver's seat and an adjacent front seat and having a driver's brake pedal adjacent to the driver's seat, said device comprising
   a rigid elongated frame member having one end portion anchored in fixed relation to the vehicle floor in front of said adjacent front seat and it opposite end portion fixed relative to and adjacent said driver's brake pedal,
   a supplemental brake pedal comprising a bellcrank having an outer and an inner arm and being pivoted adjacent the vertex of the two arms to the first named end portion of the frame member,
   a foot pad carried on the outer arm and the inner arm being normally substantially upstanding,
   a cable having one end fixed to said inner arm,
   a pair of spaced pulleys provided on the second named end portion of the frame member,
   and said cable being trained over said pulleys and having its adjacent end fixed to the driver's brake pedal
   for actuating said driver's brake pedal when said supplemental brake pedal is actuated.

3. A supplemental brake applicator device as claimed in claim 2 in which
   said frame member comprises rod means including a relatively short section forming said first named end portion and a relatively long section forming said second named end portion and a coupling element separably connecting said sections in oblique angular relation whereby either section may be disconnected and replaced by a section of different length to fit a vehicle of different design, and
   said shorter section terminates in a pad for securing the frame member to the floor of the vehicle.

References Cited
UNITED STATES PATENTS

| | | | |
|---|---|---|---|
| 2,720,121 | 10/1955 | Holum | 74—562.5 X |
| 2,799,181 | 7/1957 | Speckman | 74—562.5 |
| 2,814,212 | 11/1957 | Garver | 74—562.5 |

MILTON KAUFMAN, *Primary Examiner.*